United States Patent
Eschlbeck et al.

(10) Patent No.: US 8,685,152 B2
(45) Date of Patent: Apr. 1, 2014

(54) ACTIVATED CARBON FILTER

(75) Inventors: Johann Eschlbeck, Backnang (DE); Matthias Flach, Remseck (DE); Timo Muffler, Stuttgart (DE); Tilmann Wächter, Stuttgart (DE)

(73) Assignee: Mahle International GmbH (DE)

( * ) Notice: Subject to any disclaimer, the term of this patent is extended or adjusted under 35 U.S.C. 154(b) by 232 days.

(21) Appl. No.: 12/963,283

(22) Filed: Dec. 8, 2010

(65) Prior Publication Data

US 2011/0167773 A1 Jul. 14, 2011

(30) Foreign Application Priority Data

Dec. 9, 2009 (DE) .................. 10 2009 057 564

(51) Int. Cl.
*B01D 53/02* (2006.01)
(52) U.S. Cl.
USPC .................. 96/146; 123/519; 95/148; 95/146
(58) Field of Classification Search
None
See application file for complete search history.

(56) References Cited

U.S. PATENT DOCUMENTS

| | | | | |
|---|---|---|---|---|
| 3,572,013 A | * | 3/1971 | Hansen | ............. 96/138 |
| 4,598,686 A | | 7/1986 | Lupoli et al. | |
| 5,118,071 A | * | 6/1992 | Huelle | ............. 251/11 |
| 5,861,050 A | * | 1/1999 | Pittel et al. | ............. 95/115 |
| 6,199,397 B1 | | 3/2001 | Khelifa et al. | |
| 6,230,693 B1 | | 5/2001 | Meiller et al. | |
| 6,279,548 B1 | * | 8/2001 | Reddy | ............. 123/520 |
| 6,503,301 B2 | * | 1/2003 | Uchino et al. | ............. 96/132 |
| 6,689,196 B2 | * | 2/2004 | Amano et al. | ............. 96/112 |
| 6,773,491 B1 | | 8/2004 | Bohl | |
| 7,900,607 B2 | * | 3/2011 | Lang et al. | ............. 123/518 |
| 8,157,904 B2 | * | 4/2012 | Ammermann et al. | ......... 96/113 |
| 2002/0174857 A1 | | 11/2002 | Reddy et al. | |
| 2006/0065251 A1 | * | 3/2006 | Meiller et al. | ............. 123/519 |
| 2007/0079705 A1 | | 4/2007 | Tolles | |
| 2007/0266997 A1 | * | 11/2007 | Clontz et al. | ............. 123/519 |

FOREIGN PATENT DOCUMENTS

| | | |
|---|---|---|
| DE | 29703827 U1 | 4/1997 |
| DE | 19838996 A1 | 3/2000 |
| DE | 19952092 C1 | 10/2000 |
| DE | 102008010862 A1 | 9/2008 |
| DE | 102007046044 A1 | 4/2009 |
| EP | 1602382 A1 | 12/2005 |

OTHER PUBLICATIONS

English abstract for DE-102008010862, Sep. 11, 2008.
English abstract for DE-102007046044, Apr. 2, 2009.

* cited by examiner

*Primary Examiner* — Duane Smith
*Assistant Examiner* — Phillip Shao
(74) *Attorney, Agent, or Firm* — Rader, Fishman & Grauer PLLC

(57) ABSTRACT

An activated carbon filter including a filter housing; at least one chamber having a flow cross-section; activated carbon arranged in said chamber; and at least one carbon heating device. The heating device heats the carbon over the entire flow cross-section in a substantially uniform manner.

8 Claims, 3 Drawing Sheets

100
ACTIVATED CARBON FILTER

TECHNICAL FIELD

The present invention relates to an activated carbon filter comprising a filter housing having at least one chamber according to the preamble of the claim 1.

BACKGROUND

From U.S. Pat. No. 6,701,902 B2, a generic activated carbon filter is known which serves for binding the hydrocarbons diffusing out of a fuel tank and to subject them to a combustion process in a combustion engine. Since in case of activated carbon, the adsorption capacity for hydrocarbons is limited, such activated carbon filters have to be regularly purged after each loading with hydrocarbons. I contrast to the adsorption of hydrocarbons in the activated carbon of an activated carbon filter, a purging process in which the hydrocarbon portions are desorbed again by the activated carbon is supported by an increased temperature, for which reason the known activated carbon filter has a plate-shaped heating element which heats the activated carbon provided in the activated carbon filter in some areas to improve the desorption of the hydrocarbons.

SUMMARY

The present invention is concerned with the problem to provide for an activated carbon filter of the generic type, an improved or at least an alternative embodiment which is in particular characterized by an improved desorption behavior and an increased service life of the activated carbon.

This problem is solved according to the invention by the subject matter of the independent claim 1. Advantageous embodiments are subject matter of the dependent claims.

The present invention is based on the general idea to improve the water absorption and the life expectancy of a generic activated carbon filter in that a heating device is provided which heats the activated carbon arranged in the activated carbon filter in a substantially uniform manner. At increased temperatures, the desorption of the hydrocarbons from the activated carbon is higher and the penetration of water into the activated carbon when purging is lower. In addition, by heating the activated carbon, the remaining quantity of residual hydrocarbons and thus the aging of the activated carbon can be minimized. For this, the activated carbon filter has a filter housing with at least one chamber in which the activated carbon is arranged. Moreover, the activated carbon filter has at least one heating device for heating the activated carbon, wherein the heating device is configured in such a manner that it heats the activated carbon over the entire flow cross-section of the chamber in a substantially uniform manner. Also, in each chamber, a separate heating device can be provided. In contrast to activated carbon filters known from the prior art in which only a small area of the activated carbon is heated, the activated carbon filter according to the invention makes it possible to heat the entire flow cross-section and activated carbon arranged in the entire flow cross-section in a preferably uniform manner, whereby precisely those advantages can be achieved during the purging process.

In an advantageous development of the solution according to the invention, the heating device has a rib structure, wherein the individual ribs are aligned parallel to the flow direction in the chamber. The individual ribs of the rib structure thus serve as flow directing elements when backflushing the activated carbon filter and heat the activated carbon arranged between the individual ribs of the heating device almost uniformly. With such a rib structure, on the one hand, a high and uniformly fast dissipation of heat energy to the activated carbon and thus a preferably uniform heating of the activated carbon is possible. On the other hand, such a rib structure does not or only marginally obstruct a flow through the chamber during backflushing the activated carbon filter so that the heating device has almost no fluidic influence on the flow resistance.

In an advantageous development of the solution according to the invention, the heating device can have a different structure, in particular pales, tube bundles, pins, nails or differently structured profiles into the intermediate space of which, activated carbon can be filled.

In an advantageous development of the solution according to the invention, the heating device can be arranged directly at the fresh air inlet of the activated carbon filter so that the inflowing fresh air can be heated via the heated activated carbon.

In an advantageous development of the solution according to the invention, the heating device can be integrated, in particular molded, in a component of the activated carbon filter housing.

Advantageously, the heating device has at least one PTC heating element. Such PTC heating elements (positive temperature coefficient) are current-conductive materials which conduct the current better at low temperature than at high temperatures. Their electrical resistance thus increases with increasing temperature, whereby such a heating device is capable to independently control the dissipated heating energy. Moreover, such PCT heating elements can be produced cost-effectively so that in particular a complex and thus expensive control device can principally be eliminated.

In an advantageous development of the solution according to the invention, the heating device and the heating device's PTC heating elements arranged therein are sealed with respect to the activated carbon to prevent that the thermal conductivity of the heating element is reduced by dust of the activated carbon. Generally, when filling in the activated carbon filter, first the one heating device is inserted into one chamber and subsequently, the chamber is filled with activated carbon. If a plurality of chambers each with one heating device is provided, first the individual heating devices are inserted into the chambers and after this, each chamber is filled with activated carbon.

Further important features and advantages arise from the sub-claims, from the drawings, and from the associated description of the figures based on the drawings.

It is to be understood that the above mentioned features and the features yet to be explained hereinafter can be used not only in the respectively mentioned combination but also in other combinations or alone without departing from the context of the present invention.

Preferred exemplary embodiments of the invention are illustrated in the drawings and are explained in the following description in more detail, wherein identical reference numbers refer to identical, or similar, or functionally identical components.

DETAILED DESCRIPTION

Figure 1:
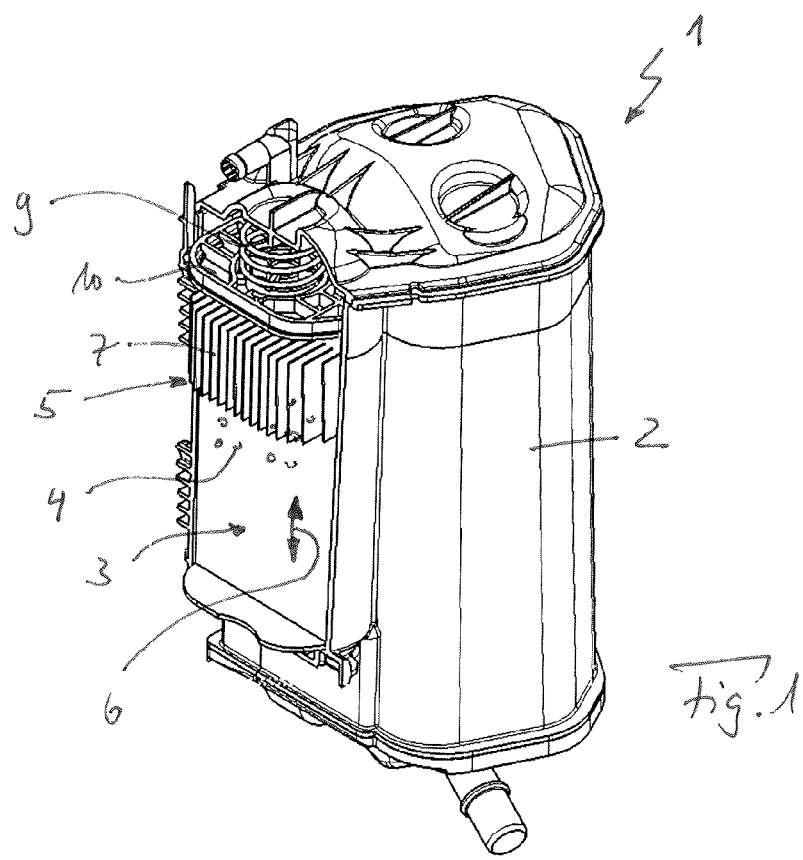
FIG. 1 shows a view on an activated carbon filter according to the invention with a chamber cut in the region of a heating device.

An activated carbon filter of the generic type is used to clean hydrocarbon-containing air escaping from the fuel tank before the air is released into the environment. There are two cases in which air escapes from the fuel tank, namely, on the one hand, during refueling and, on the other, during a standstill or a slow movement of the motor vehicle. In the first case, relatively high amounts of hydrocarbons have to be collected, that is, adsorbed within a relatively short time. In the second case, this can happen over long periods of time and with rather small and extremely small amounts. In order that an activated carbon filter becomes a durable component of a motor vehicle, the hydrocarbons have to be desorbed from the activated carbon. For this purpose, the activated carbon filter is purged with fresh air during the normal driving operation. Said air passes through the activated carbon filter whereby the hydrocarbons desorb and thus clean the activated carbon. After this, the air is fed to the combustion engine where the hydrocarbons are combusted. To achieve this storage capacity, the activated carbon has a lot of small grains with small pores in which the hydrocarbons accumulate. In case of activated carbon filters which are not configured according to the invention, a gradual aging of the activated carbon takes place and long-chain hydrocarbons are not desorbed anymore from the activated carbon by the fresh air at normal ambient temperatures. Thereby, the adsorption sites for butane and short-chain hydrocarbons are blocked and the activated carbon filter can no longer store the occurring amount of hydrocarbon, for example in case of refueling, so that the air escaping from the fuel tank is no longer effectively cleaned and thus hydrocarbons can escape into the environment. It can be tried to prevent this, on the one hand, by very large volumes of activated carbon or by heating the activated carbon. Said heating prevents in addition unnecessary penetration of water into the activated carbon filter. If the activated carbon is heated during the purging process and the heating device is located in the inflow region or, respectively, in the activated carbon directly at the fresh air inlet of the activated carbon filter, the relative humidity of the fresh air can be reduced. The water penetrated with the fresh air can also occupy adsorption sites for hydrocarbons. This is in particular to be prevented in the last chamber before the air discharges. In the case of fueling it can happen that it is precisely said last chamber which has to filter the hydrocarbons contained in the air because the other chambers are already saturated with hydrocarbons. A chamber is to be understood as a section with changed flow cross-section or a different activated carbon; it is not absolutely necessary that a wall or a sieve or a transition channel is located therebetween. The activated carbon can have different operating capacities in different chambers, that is, the pore size and the particle diameter can be different in each chamber.

According to FIG. 1, an activated carbon filter 1 according to the invention has a filter housing 2 with at least one chamber 3 in which activated carbon 4 as well as at least one heating device 5 for heating the activated carbon 4 are arranged. The chamber 3 is shown according to FIG. 1 in a partial sectional view, wherein the heating device 5 is configured according to the invention in such a manner that it heats activated carbon 4 over the entire flow cross-section of the chamber 3 in a substantially uniform manner. Thus, the heating device 5 is substantially uniformly distributed over the flow cross-section, wherein the main flow directions for the fueling process/tank ventilation process as well as for the purging process running in the opposite direction are illustrated with the double flow arrow 6.

Figure 2:
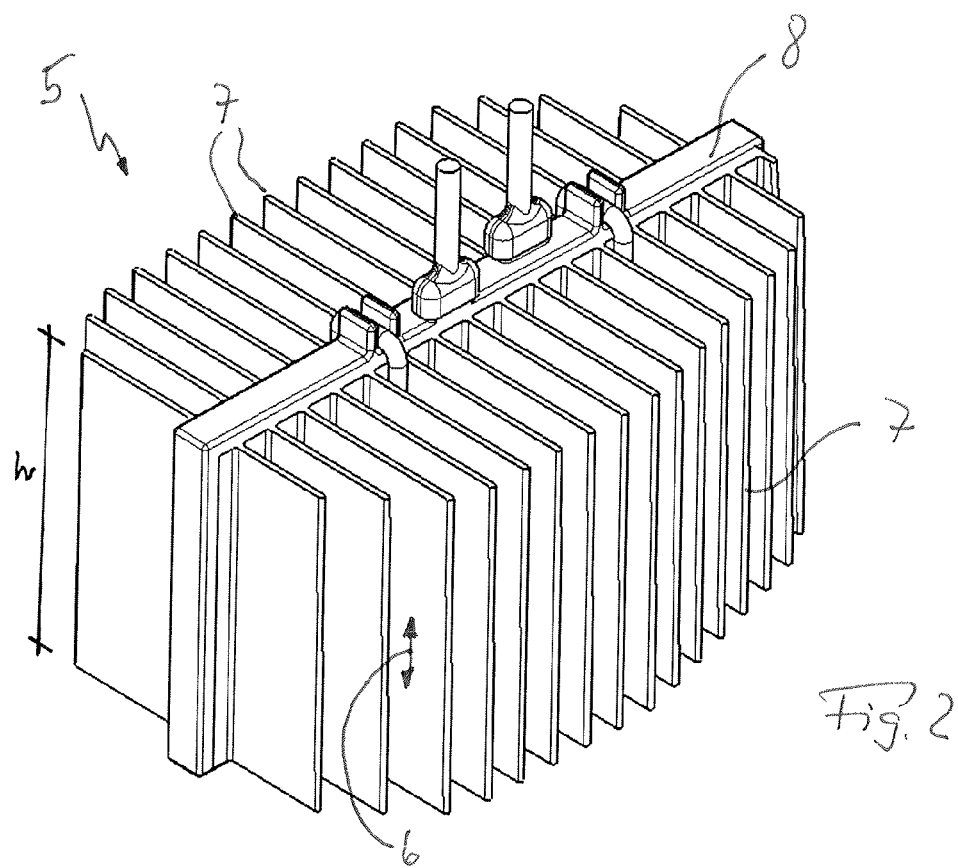
FIG. 2 shows an oblique view of the heating device.
Figure 3:
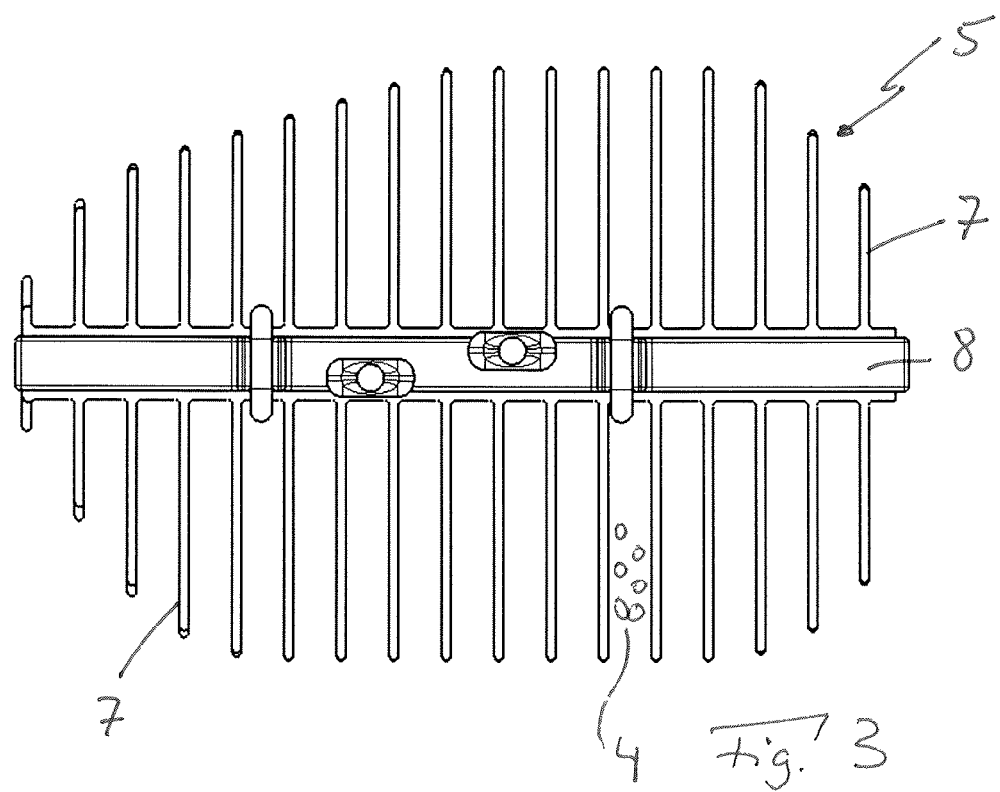
FIG. 3 shows a top view of the heating device.
Figure 4:
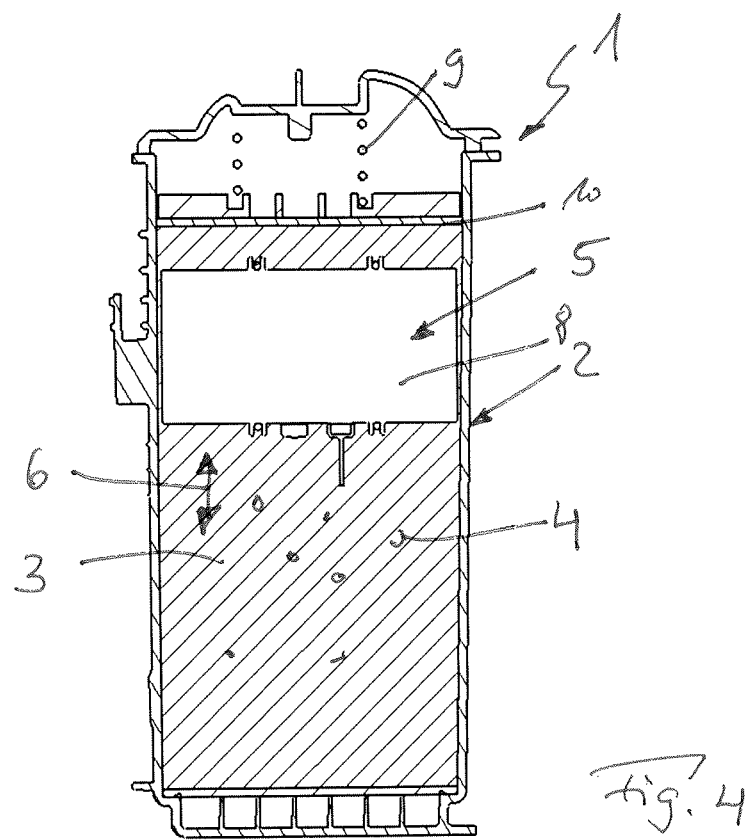
FIG. 4 shows a cross-sectional illustration of the activated carbon filter.

In the FIGS. 1 to 3, an embodiment of the heating device 5 is shown which has a rib structure, wherein the individual ribs 7 are aligned parallel to the flow direction 6 in the chamber 3. Accordingly, the ribs 7 of the heating device 5 form a kind of flow directing elements between which activated carbon particles are arranged which are directly heated by the ribs. The heating device 5 can comprise at least one PTC heating element 8 which, due to temperature-dependent resistance changes, is capable to independently control the heating energy to be dissipated corresponding to the temperature. In the filter housing 2 shown in FIG. 1, the heating device 5 is located directly underneath a plate 10, via which plate a spring device 9 firmly compresses the activated carbon in the chamber 3. In this manner, the inflowing air entering in the housing 2 through the air inflow opening and a purge valve is already heated when flowing into the activated carbon filter 1 by passing over the heated activated carbon. Through this heating, the heat loss which takes place during the desorption can also be compensated. Based on the structure of this exemplary embodiment, the filling process is as follows: The lower part of the chamber 3 is filled with activated carbon, the heating device 5 is inserted, the rest is filled in, the plate 10 with spring device 9 is put on top and the filter housing 2 is closed.

Overall, of course, the activated carbon filter 1 can comprise three or more chambers 3, wherein the heating device 5 is arranged in the chamber 3 facing towards the environment. Alternatively, in each chamber 3, a separate heating device 5 can be provided. Said heating device(s) is (are) controlled with a circuit via a central current generator. Since the PTC heating elements 8 operate in an independently controlling manner, a simple on and off switching of all heating devices 5 is sufficient to be switched on during the normal driving operation and thus during the purging process. The hydrocarbons escaping from the non-shown fuel tank thus have first to pass through the individual chamber 3 without heating device 5 before reaching the chamber 3 with the heating device 5. Of course, the chambers 3 without heating device are also filled with activated carbon 4 and thus are capable for the adsorption of hydrocarbons. The activated carbon 4 provided in the individual chambers 3 usually has a particle size of d>1 mm, wherein the distance between the individual ribs 7 of the heating device 5 is significantly larger than the largest occurring particle size so that filling the chamber 3 with activated carbon 4 is possible without any problems even after the installation of the heating devices 5.

In addition, a non-illustrated control device can be provided which activates the heating device 5 and, in particular, the PTC heating element 8 in the heating device 5, if this is desired. This is usually desired during a purging process, that is, during the desorption during which the hydrocarbons accumulated in or on the activated carbon 4 are released again and, after purging, are subjected to a combustion in the combustion engine. Also provided can be the aforementioned spring device 9 which compresses the activated carbon 4 in the chamber 3 and thereby is able to compensate the volume equalization during compacting processes of the carbon due to vibrations in the vehicle or to prevent an undesired shaking of the individual activated carbon particles. The spring device 9 or, respectively, a flow-permeable plate 10 connected thereto can abut directly on the heating device 5; however, it is also possible that an activated carbon layer is present between the heating device 5 and the plate 10. As illustrated in the FIGS. 1 and 3, the heating device 5 can extend only over a portion of the length of the chambers 3 or can fill them out over the entire length. The heating device 5 is generally capable to generate a temperature of up to 140° and thereby to subject the carbon and the purge air to a temperature of more than 80°, wherein, of course, other temperatures can also be set by means of the selection of the PTC heating element 8. The selected temperature is preferably selected in such a manner that desorption is improved and aging and water penetration is reduced.

Figure 5:
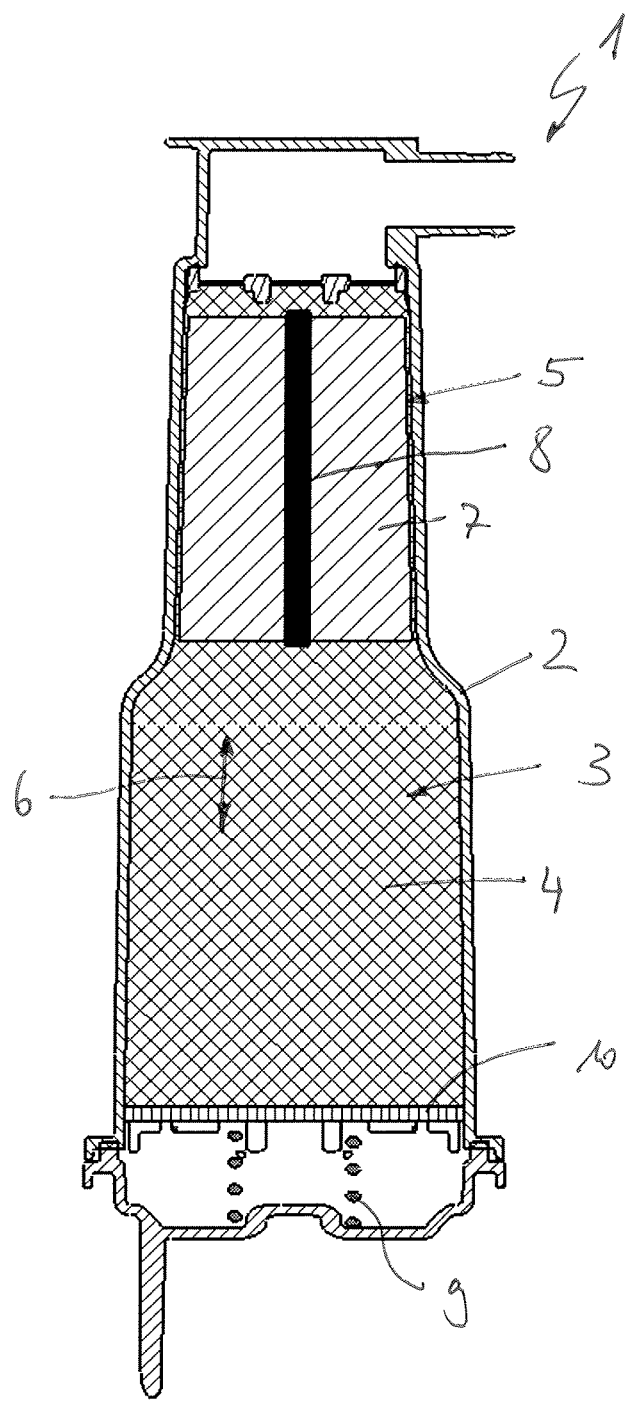
FIG. 5 shows an alternative structure of the activated carbon filter.

FIG. 5 illustrates an alternative structure of an activated carbon filter 1. In particular the last chamber 3 before the air outlet or, respectively, the chamber next to the air inlet is structured the other way round. In this example, the opening to the environment is not on the side on which the filter housing 2 is closed by means of a cover, but on the opposite side so that the heating device 5 is inserted before the activated carbon 4 is filled in. The heating device 5 can also be integrated in the plastic of the filter housing 2. Usually, a fleece lies between the plate 10 and the activated carbon 4 to prevent that the activated carbon crumbles into a flow region. Said fleece can be attached on the heating device 5 or can be clamped by the heating device 5 to the plate 10. Also, the heating device 5 can be firmly clamped to the plate 10 and is then mounted together with the latter in the filter housing 2.

Alternatively, in a non-shown embodiment, the heating device 5 can consist of a plurality of sub-elements. For example, they can consist of two identical elements which are arranged next to each other and which can have ribs which run perpendicular or at an angle to each other. Further alternatives are a plurality of parallel tubes which contain the PTC heating element 8 and which have spikes, ribs, corrugated ribs or the like on their outer contour to thereby improve the heat input into the activated carbon 4. Depending on the requirements, the distance between the ribs 7 shown in FIG. 3 also can vary from the inside outwards. The outer enveloping shape of the ribs 7 is adapted to the respective shape of the activated carbon filter 1. This applies also to their height h. Said height h can vary over the width of the heating device 5 to optimize all processes.

The PTC heating elements 8 which are integrated in the heating device 5 can be round or angular; however, it is important that no activated carbon dust can accumulate between the PTC heating elements 8 and the ribs 7 which otherwise would impede the heat transfer. The ribs 7 are preferably made from metal; it is in particular preferred to make the ribs 7 or other heat conducting elements from aluminum. The flow conveyance to the outside can be guided laterally through the filter housing 2 or at the top and at the bottom, depending on what makes more sense or is more practical for the respective application.

With the activated carbon filter 1 according to the invention it is therefore possible to heat the entire cross-section through which purge air flows during the purging process of the activated carbon filter 1 and to thereby facilitate the desorption, anti-aging and anti-water penetration, wherein, of course, not only the activated carbon 4 is directly heated but, at the same time, also the fresh air flowing therethrough and drawn in from the outside can be heated. Due to these improvements of the activated carbon filter 1, the emission behavior can also be significantly improved.

The invention claimed is:

1. An activated carbon filter, comprising:
   a filter housing;
   a chamber having a flow cross-section;
   activated carbon arranged in said chamber; and
   a carbon heating device inserted in the filter housing, wherein the heating device heats the active carbon over the entire flow cross-section of the chamber in a substantially uniform manner;
   wherein the heating device has at least one of a rib structure having a plurality of individual ribs, pales and tube bundles, wherein at least one of the individual ribs, pales and tubes bundles are aligned parallel to a flow direction in the chamber.

2. The activated carbon filter according to claim 1 wherein the heating device includes at least one PTC (positive temperature coefficient) heating element.

3. The activated carbon filter according to claim 1, wherein the heating device is arranged in the chamber facing towards an environment on the activated carbon filter's side facing towards fresh air.

4. The activated carbon filter according to claim 1, further comprising a control device, wherein the control device activates the heating device at least during a purging process.

5. An activated carbon filter, comprising:
   a filter housing;
   a chamber having a flow cross-section;
   activated carbon arranged in said chamber;
   a carbon heating device inserted in the filter housing; and
   a control device, wherein the control device activates the heating device at least during a purging process, and wherein the heating device heats the active carbon over the entire flow cross-section of the chamber in a substantially uniform manner;
   wherein the heating device has at least one of a rib structure having a plurality of individual ribs, pales and tube bundles, wherein at least one of the individual ribs, pales and tubes bundles are aligned parallel to a flow direction in the chamber.

6. The activated carbon filter according to claim 5, wherein the heating device includes at least one positive temperature coefficient heating element.

7. The activated carbon filter according to claim 5, wherein the heating device is arranged in the chamber facing towards an environment on the activated carbon filter's side facing towards fresh air.

8. The activated carbon filter according to claim 5, further comprising a control device, wherein the control device activates the heating device at least during a purging process.

* * * * *